(12) United States Patent
Dao et al.

(10) Patent No.: US 6,915,369 B1
(45) Date of Patent: Jul. 5, 2005

(54) MODULAR AND SCALABLE SYSTEM BUS STRUCTURE

(75) Inventors: Tuan Q. Dao, Richardson, TX (US); Pius Ng, Plano, TX (US); Paul Look, Richardson, TX (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/343,872

(22) Filed: Jun. 30, 1999

Related U.S. Application Data (63) Continuation-in-part of application No. 09/257,840, filed on Feb. 25, 1999.

(51) Int. Cl.[7] .............................................. G06F 13/14
(52) U.S. Cl. ...................... 710/305; 710/317; 710/316; 710/306; 710/244
(58) Field of Search ................................ 710/305, 244, 710/316–317, 306, 307, 303, 308, 261; 711/104–105, 154–170

(56) References Cited

U.S. PATENT DOCUMENTS

| | | | | |
|---|---|---|---|---|
| 5,581,767 A | * | 12/1996 | Katsuki et al. ................ | 712/11 |
| 5,815,457 A | * | 9/1998 | Pascucci ................ | 365/230.06 |
| 5,890,003 A | * | 3/1999 | Cutts et al. .................. | 710/263 |
| 5,987,576 A | * | 11/1999 | Johnson et al. ............. | 711/167 |
| 6,092,141 A | * | 7/2000 | Lange | |
| 6,125,429 A | * | 9/2000 | Goodwin et al. ........... | 711/143 |
| 6,141,718 A | * | 10/2000 | Garnett et al. .............. | 710/308 |
| 6,148,356 A | * | 11/2000 | Archer et al. | |
| 6,263,393 B1 | * | 7/2001 | Funaya et al. .............. | 710/316 |
| 6,275,891 B1 | * | 8/2001 | Dao et al. .................... | 710/317 |
| 6,298,384 B1 | * | 10/2001 | Sudo et al. .................. | 709/232 |
| 2002/0002662 A1 | * | 1/2002 | Olarig et al. ................ | 711/167 |
| 2002/0091905 A1 | * | 7/2002 | Geiger et al. ................ | 711/170 |
| 2002/0161965 A1 | * | 10/2002 | Ryan .......................... | 711/105 |

* cited by examiner

Primary Examiner—Tim Vo
Assistant Examiner—Kim T. Huynh
(74) Attorney, Agent, or Firm—Conley Rose, P.C.

(57) ABSTRACT

A high-bandwidth data transfer apparatus that is suitable for modular and scalable processing systems is disclosed. In one embodiment, the data transfer apparatus includes a local bus between each of several processing devices and associated memory modules. The local busses are each coupled to a cross-bus through a bus bridge that consists of multiplexers to steer address and data signals from a local bus along the cross-bus to another local bus. The multiplexer structure of the bridges allows the cross-bus to be dynamically divided into segments in any suitable manner to support multiple concurrent links over the cross-bus. A controller is provided to set the multiplexers in accordance with transfer requests that it receives from the various processing devices. The transfer requests may be of various types such as: single transfer, block transfer, and/or message transfer. The controller may include a request queue for each type of transfer request. The controller may also include a direct memory access controller (DMA) for facilitating the block transfers, and may further include an interrupt controller for notifying the processing devices of various events such as: receipt of a message transfer request, completion of block transfer, and/or memory protection violation. The data transfer apparatus may include a processor interface port for each processor. The ports may be configured to enforce programmable memory protection settings. When applied to multimedia systems with a microcontroller, one or more digital signal processors, and one or more hardware accelerators, this data transfer apparatus is expected to provide a substantial increase in processing capabilities.

25 Claims, 5 Drawing Sheets

MODULAR AND SCALABLE SYSTEM BUS STRUCTURE

RELATED APPLICATIONS

This application is a continuation-in-part of U.S. patent application Ser. No. 09/257,840 filed Feb. 25, 1999 and entitled "Modular and Scalable System Architecture for Signal and Multimedia Processing" by T. Q. Dao, Pius Ng, and Paul Look. This parent application is hereby incorporated by reference in its entirety.

BACKGROUND OF THE INVENTION

1. Field of the Invention

This invention relates to the field of system bus architectures suitable for modular and scalable processing systems. More specifically, this invention relates to a bus structure that provides simultaneous high memory access bandwidth to multiple modules.

2. Description of the Related Art

Digital multimedia systems require a substantial digital signal processing capability. This requirement is shared by many other digital systems including image rendering systems, artificial vision systems, digital communication systems, and speech recognition systems. The typical architecture for such systems is shown in FIG. 1.

Figure 1:
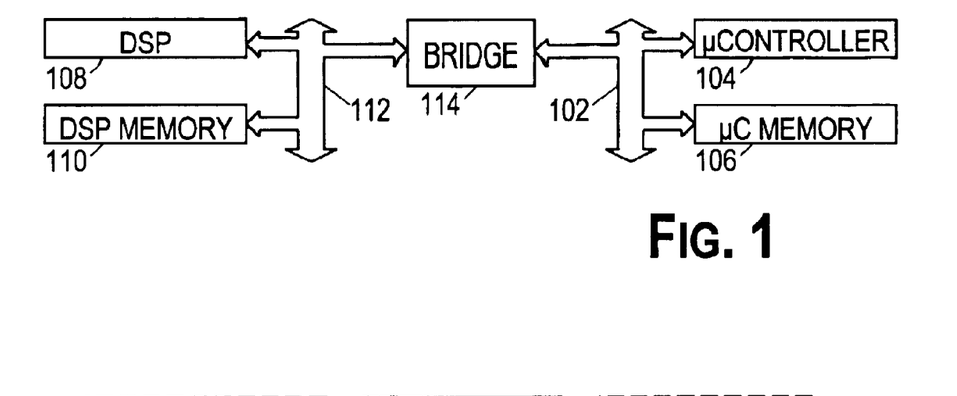
FIG. 1 shows a system architecture for a multimedia device with a digital signal processing subsystem.

FIG. 1 shows a microcontroller bus 102 which couples a microcontroller 104 to a microcontroller memory 106. A digital signal processor (DSP) 108 is similarly coupled to a DSP memory 110 by a DSP bus 112. The two busses are coupled by a bus bridge 1114.

This architecture is popular since the microcontroller 104 can assume the responsibility for system-level functions (such as controlling a user interface, initiating and terminating operation of various system modules, and coordinating data transfers), and the DSP 108 can assume the responsibility for computationally-intensive tasks (such as various coding and compression algorithms, filtering operations, and data transforms). This division of labor eases system design and programming.

However, this architecture is inadequate for future generations of digital multimedia systems. The processing requirements are being increased as designers take advantage of compression algorithms and higher bandwidths to transmit more information. To keep pace, this architecture requires a more powerful DSP.

A more powerful DSP can be created in two ways. The clock speed can be increased, but this requires careful optimization and redesign of the DSP for every incremental improvement in semiconductor processing technology. Alternatively, the DSP can be provided with wider data paths, e.g. an 8-bit DSP could be replaced with a 32-bit DSP. However, the increases in the required area and power consumption are quadratic (i.e. to double the data path width, the area and power requirements increase by approximately a factor of four). This alternative is undesirable since power consumption is a perennial design constraint, particularly in view of the increasing popularity of portable devices.

Furthermore, larger data path widths are likely to be a poor "fit" for the data granularity, leading to inefficient use of the more powerful DSPs. For example, MPEG video compression operates on 8-bit blocks of video data. Even if multiple blocks were retrieved at a time, the DSP could only perform (at most) one 8-bit block operation per clock cycle. The rest of the data path width is unused for these operations.

To address these problems, this architecture may be modified by the addition of a dedicated hardware accelerator that is custom-designed to efficiently and quickly carry out specific algorithms. The hardware accelerator may be coupled to the DSP 108 and the DSP memory 110 via the DSP bus 112. The DSP 108 then performs the less demanding computationally-intensive tasks of pre-processing and post-processing the data, and allows the hardware accelerator to perform the processing steps that the DSP 108 is too inefficient to perform.

If the hardware accelerator includes its own memory buffer, then direct memory transfers may be used to move the data across bus 112. This represents undesirable power consumption, but the alternative is to require that the DSP bus 112 provide a high bandwidth connection between the hardware accelerator and DSP memory 110. This alternative presents a memory contention issue that practically requires the DSP 108 to halt whenever the hardware accelerator is operating. Consequently, DSP bus 112 becomes a bottleneck that restricts system performance.

Accordingly, it is desirable to have a high-bandwidth bus structure that is suitable for modular and scalable processing systems.

SUMMARY OF THE INVENTION

A high-bandwidth data transfer apparatus that is suitable for modular and scalable processing systems is disclosed. In one embodiment, the data transfer apparatus includes a local bus between each of several processing devices and associated memory modules. The local busses are each coupled to a cross-bus through a bus bridge that consists of multiplexers to steer address and data signals from a local bus along the cross-bus to another local bus. The multiplexer structure of the bridges allows the cross-bus to be dynamically divided into segments in any suitable manner to support multiple concurrent links over the cross-bus. A controller is provided to set the multiplexers in accordance with transfer requests that it receives from the various processing devices. The transfer requests may be of various types such as: single transfer, block transfer, and/or message transfer. The controller may include a request queue for each type of transfer request. The controller may also include a direct memory access controller (DMA) for facilitating the block transfers, and may further include an interrupt controller for notifying the processing devices of various events such as: receipt of a message transfer request, completion of block transfer, and/or memory protection violation. The data transfer apparatus may include a processor interface port for each processor. The ports may be configured to enforce programmable memory protection settings. When applied to multimedia systems with a microcontroller, one or more digital signal processors, and one or more hardware accelerators, this data transfer apparatus is expected to provide a substantial increase in processing capabilities that can be maintained under power consumption constraints and that will be enhanced as semiconductor technologies continue to improve.

BRIEF DESCRIPTION OF THE DRAWINGS

A better understanding of the present invention can be obtained when the following detailed description of the preferred embodiment is considered in conjunction with the following drawings, in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENT

Figure 2:
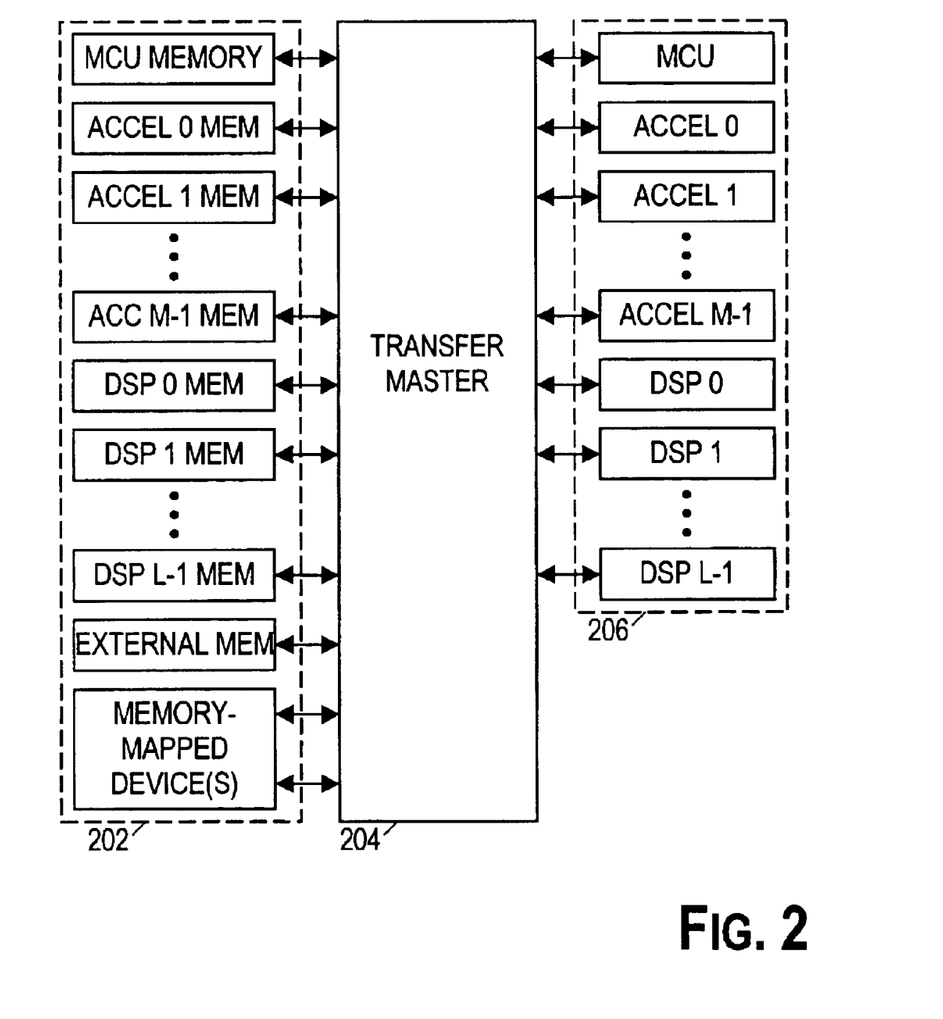
FIG. 2 is shows a modular, scalable bus architecture according to the present invention.

FIG. 2 shows a modular, scalable, bus architecture that supports concurrent high-bandwidth memory connections for each processor element in the system, and that is suitable for systems employing one or more digital signal processors and hardware accelerators. As will be apparent after reading the following disclosure, systems employing this bus architecture may be easily scaled and customized to specific applications. The customization can address various system design constraints such as power consumption, performance, and re-use of existing modules.

The architecture as shown in FIG. 2 includes three portions: a memory portion 202, a data transfer portion (transfer master) 204, and a processor portion 206. Memory portion 202 is an array of memory units and memory mapped devices each coupled to the transfer master 204 by address, data, and control lines.

The memory units preferably receive enable, read, and write control signals on the control lines, and respond in the standard manner. In other words, an enabled read operation causes a memory unit to provide read data on the data lines. Read data is a set of signals that represent data retrieved from a memory location identified by the address signals. An enabled write operation causes a memory module to store write data from the data lines in a memory location identified by the address signals. When the memory unit is not enabled, it takes no action.

The memory units preferably consist of memory modules that have a common data width, preferably eight bits. Memory modules may be combined to form a "memory unit" where greater data widths are needed. The depth (number of storage locations) of the memory modules may vary between memory units. Each memory module preferably has a read port and a write port. Such a memory module can be implemented using a time-multiplexed single port memory. In other words, a memory which supports only one access at a time (a single port memory) can be clocked at twice the system clock and the accesses may be alternated between read and write operations. This is not a fundamental requirement of the architecture, and other embodiments employing single port memory modules and multi-port memory modules (memory modules which support multiple simultaneous read/write accesses) are also contemplated.

It is noted that the design of the memory modules may be determined independently of the design and arrangement of the data transfer portion 204 and the processor portion 206. The transfer master 204 preferably provides a standardized interface to which the memory modules may be coupled.

Transfer master 204 independently coordinates all inter-processor, inter-memory, and processor-memory communications. The structure of transfer master 204 is discussed further below. However, it is noted here that the transfer master operates to organize the memory portion 202 into a shared memory which is wholly accessible (subject to programmable memory protection settings) to each processor unit. The processor units are each assigned ownership of a memory module. The memory module corresponds to a memory "page" (the size of each memory page is individually configurable). Access to memory pages owned by other processor units may be obtained by a given processor unit by setting the given processor unit's page pointer to point to the desired memory page. Memory addresses from a processor unit are treated as offset addresses from the address indicated by the processor unit's page pointer.

It is noted that using a shared memory largely eliminates the need for block transfers of memory (block transfers may still be desired, e.g. for creating multiple copies of data). This is expected to provide advantages to the system in terms of reduced power consumption and increased memory bandwidth. It is further noted that the use of page pointers eliminates any memory size limitations that the fixed width of a processor unit's address path might otherwise impose. This allows a system to be scaled as needed without any redesign of the processor units.

Processor portion 206 is an array of two or more processor units. The processor units may be of various types such as a digital signal processor (DSP), a hardware accelerator (denoted "ACCEL" in the figures), a microcontroller unit (MCU), or an interface port to a system including any one of these. The transfer master 204 preferably provides a standardized interface for coupling to the processor units. The processor units are coupled to the transfer master 204 by control lines, address lines, and data lines. The control lines preferably carry control signals such as Enable, Read, Write, Ready, and Interrupt. The processor units preferably provide the Enable, Read, and Write signals on the control lines, and receive the Ready and Interrupt signals. The control lines may further carry transfer request signals from the processor units. These signals preferably include a transfer type, a transfer source, a transfer target, and a transfer size.

To send data, a processor unit provides an address on the address lines, data on the data lines, and a transfer request on the control lines. The processor unit then asserts the Enable signal and the Write signal. The transfer master 204 transfers the data and asserts the Ready signal when it is ready for any subsequent data transfer operation. To receive data, a processor unit provides an address on the address lines and a transfer request on the control lines, asserts the Enable signal and the Read signal, and waits for an assertion of the Ready signal. The transfer master 204 retrieves the data and provides the data on the data lines, then asserts the Ready signal to indicate that the data is available. It is noted that the design of the processor units is determined independently of the design and arrangement of other processor units, the transfer master 204, and the memory portion 202. This is achieved through the use of a standardized processor interface provided by the transfer master 204.

Figure 3:
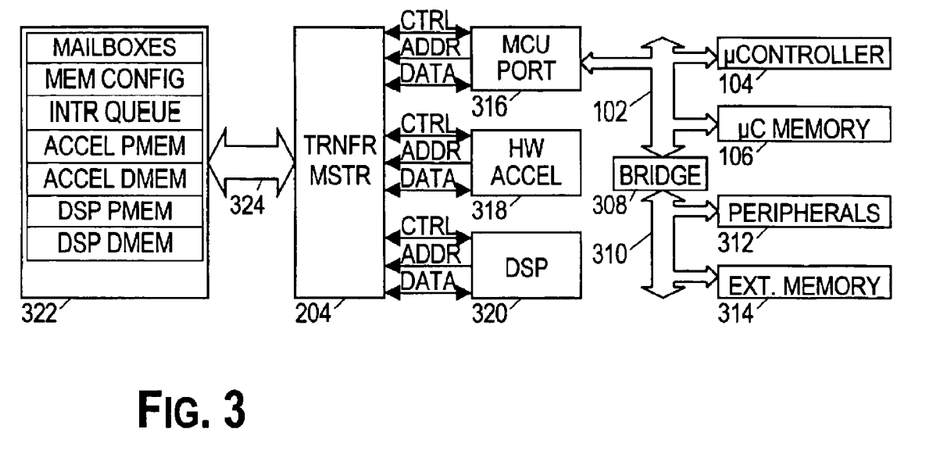
FIG. 3 is a functional block diagram of a first system embodiment that employs a bus architecture according to the present invention.

FIG. 3 shows a functional block diagram of one system embodiment that illustratively employs the present architecture. The system includes a microcontroller bus 102 which couples a microcontroller unit 104 to a microcontroller memory 106 and a bus bridge 308. Bus bridge 308 couples microcontroller bus 102 to a peripheral bus 310, whereby the microcontroller 104 can access peripheral devices 312 and external memory 314. Peripheral devices 312 preferably provide an interface to the external environment whereby the microcontroller unit 104 can obtain input data and instructions and can provide output results. External memory 314 preferably provides long term program and data storage when the system is powered down.

Coupled to the microcontroller bus 102 is a microcontroller unit (MCU) port 316, whereby the microcontroller 104 may communicate with the numerical processing subsystem. A transfer master 204 is coupled to the MCU port 316 and various special purpose processors such as a hardware accelerator 318 and a digital signal processor (DSP) 320. Transfer master 204 coordinates data transfers between the array of processors (including the microcontroller 104 via MCU port 316) and a logically-mapped shared memory 322 via data path 324. Transfer master 204 handles memory-to-memory, memory-to-processor, processor-to-memory, and processor-to-processor data transfers.

Shared memory block 322 represents the logical map of the memory address space as it appears to the processors. The shared memory is preferably used to store program instructions (PMEM) and data (DMEM) for each of the processors, as well as mailbox information (for interprocessor communication), memory configuration information, and interrupt queue information. The memory is divided into pages, with ownership, reading, writing, and execution privileges of each processor for each page being assigned in the memory configuration information. Subject to these programmed privileges, the transfer master 204 allows every processor to read or write from any of the memory pages. Each processing unit supplies a page pointer to the transfer master 204 as part of the transfer request information (the transfer source or target). The individual processor units gain access to the various memory pages by setting their page pointers accordingly.

It is noted that logically-mapped shared memory 322 and data path 324 are conceptual representations provided for explanatory purposes, and are not necessarily present as physical circuits in an implemented system. Rather, the shared memory 322 is preferably implemented partially as registers (for memory configuration and the interrupt queue) and partially as separate, strategically placed memory modules of various sizes. Data path 324 preferably comprises a plurality of address and data busses which are routed to corresponding memory modules, registers, and memory-mapped devices.

In a preferred embodiment, the program instructions for each of the processor units are kept in memory array 202. In an alternate embodiment, the program instructions may be kept in dedicated memories coupled directly to the processor units. Other embodiments are also contemplated that employ some combination of this.

Figure 4:
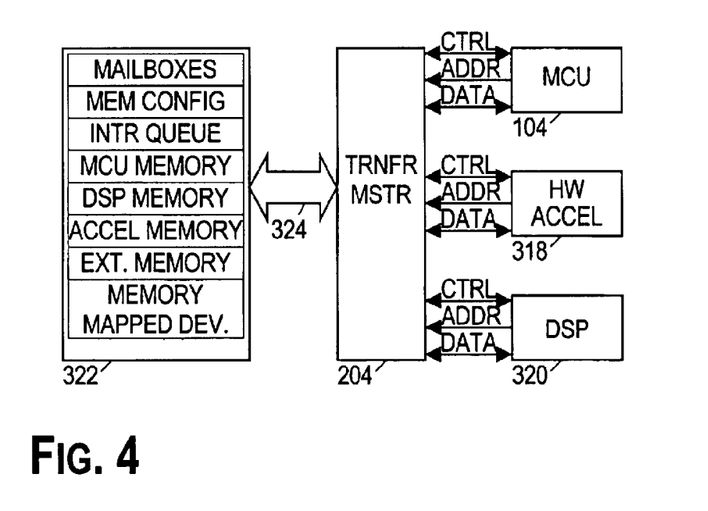
FIG. 4 is a functional block diagram of a second system embodiment that employs a bus architecture according to the present invention.

FIG. 4 shows a functional block diagram of a second system embodiment that illustratively employs the present architecture. In this system embodiment, the microcontroller 104 is coupled directly to the transfer master 204. The microcontroller memory, external memory, and peripherals are coupled to the transfer master 204 and logically mapped into the shared memory 322.

Figure 5:
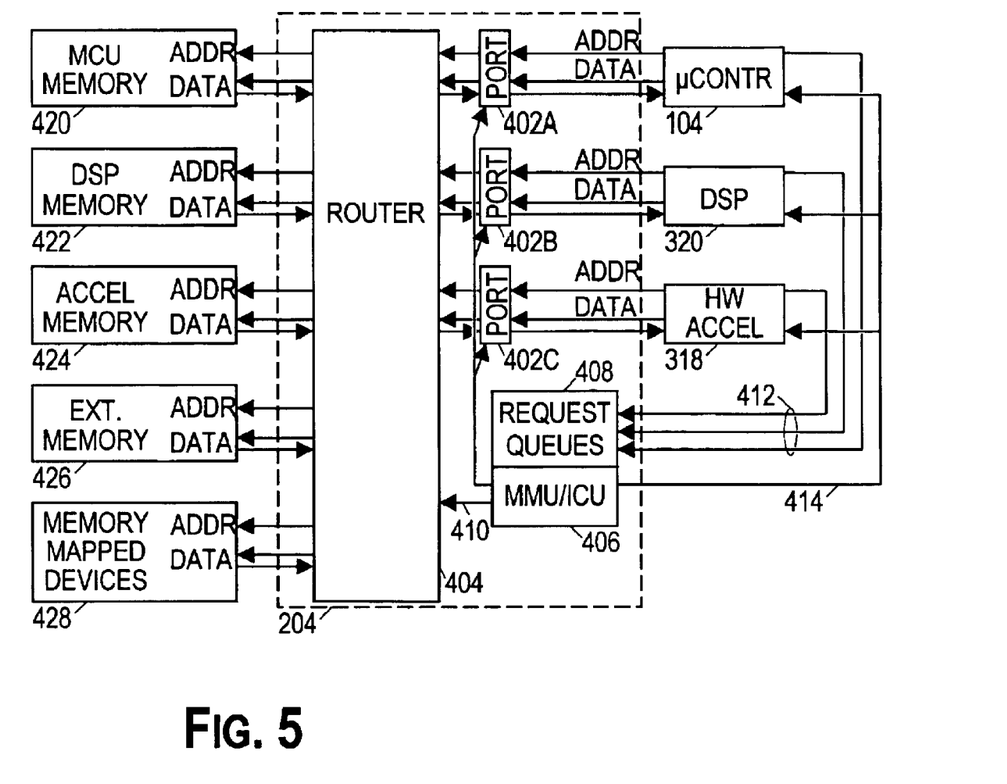
FIG. 5 is a functional block diagram of a transfer master.

FIG. 5 shows an exemplary embodiment of transfer master 204. Transfer master 204 preferably comprises port buffer logic 402 for latching address, write data, and control signals from the processors, and for driving control and read data signals to the processors. The port buffer logic 402 may additionally provide timing synchronization, control signal generation, and multiplexing/de-multiplexing functions, as necessary.

Port buffer logic 402 couples the address and data signals from processors 104 (possibly via MCU port 316), 318, and 320, to router 404, and also receives control signals from memory management unit (MMU) 406. The memory management unit 406 provides the control signals to port logic 402 and a conflict-free access pattern 410 to router 404 in response to transfer requests stored in one or more request queues 408. Processor units 104, 318, 320 place transfer requests in the queues 408 via transfer request lines 412.

Request queues 408 preferably include a single transfer queue, a block transfer queue, and a mailbox message queue. Single transfers are transfers of a single word. They are intended for fast transfers between a processing unit and the corresponding memory module, and are accordingly assigned highest priority. Block transfers are transfers of a block of memory. Block transfers are intended primarily for direct memory access (DMA)-type transfers of data between memory modules. The priority of these transfers is user-configurable, and these transfers can be interrupted by transfers having a higher priority (such as single transfers). Mailbox messages notify a target processing unit of the need to carry out a transfer of information from a specified address. Mailbox messages are intended for transfers of information between processing units. The target devices are notified of the existence of the message via an interrupt, and the transfer is carried out in a manner determined by the target processing unit.

The MMU 406 responds to the contents of the request queues by establishing an access pattern that provides for the highest priority transfer requests and as many other transfer requests as possible without creating an access conflict. This conflict-free access pattern 410 is provided to the router 404. The pattern signal 410 sets switches in the router to establish connections between the processing units and memory modules 420–428 that will allow for the transfer requests to occur. It is noted that configuration and status registers for the transfer master 204 may be accessible as one of the memory mapped devices 428. The MMU 406 may provide control signals to the port logic 402 to delay accesses that cannot occur in the context of the chosen access pattern 410.

Figure 6:
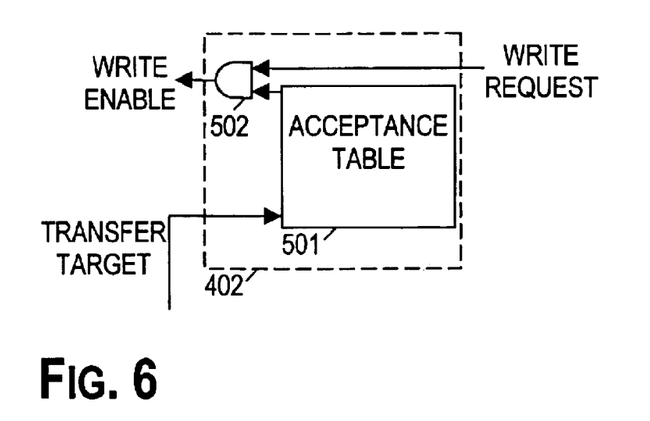
FIG. 6 shows an illustrative memory write-protection portion of a device port.

The MMU preferably maintains a distributed memory configuration table that tracks such things as read, write, and execute permissions of each processor for each memory page. In one embodiment, the MMU 406 provides control signals to port logic 402 to enforce memory protection. For example, FIG. 6 shows one way to implement memory write protection. One embodiment of a port 402 includes a configurable acceptance table 501 and a pass gate 502. MMU processes the contents of the request queues 408 and generates a transfer target identifier for each of the ports 402. The transfer target is provided to acceptance table 501, which responsively asserts or de-asserts an accept signal. A pass gate 502 logically ANDs the accept signal with the write request signal from the processing unit. The output of pass gate 502 is a write enable signal that is suppressed if the transfer target is not one of the allowable write-transfer targets as specified by the acceptance table 501. It is noted that a status bit may be set in one of the transfer master status registers to indicate the detection of an attempted illegal write.

Referring back to FIG. 5, transfer master 204 also preferably includes an interrupt control unit (ICU) which provides interrupt signals 414 to each of the processors. The interrupts may be used for block transfers, mailbox messages, memory protection violations, etc. Processors can initiate block transfers of data by writing a block transfer request to the block transfer queue. The MMU 406 will then handle the address generation and routing for block transfers of data. The ICU can be configured to assert an interrupt to the block transfer requestor to notify the requester of the completion of the transfer.

Processors can communicate by writing mailbox messages to other processors. After the MMU 406 determines that a mailbox message is present in the request queue, the ICU asserts an interrupt to notify the addressee of the message's existence. If the MMU 406 detects the DSP writing to the hardware accelerator's memory page without programmed write permission, the ICU may assert an interrupt to alert one of the processors of the memory protection, violation.

It is expected that MMU 406 will have a relatively uncomplicated (and therefore fast) implementation much simpler than a typical general purpose memory controller for a shared memory system. Each processor's accesses to its own memory pages are expected to incur no latency (i.e. read data is received on the first clock cycle subsequent to the clock cycle in which the address is provided), and only a minimal latency is expected to be incurred by accesses to other memory pages.

Figure 7:
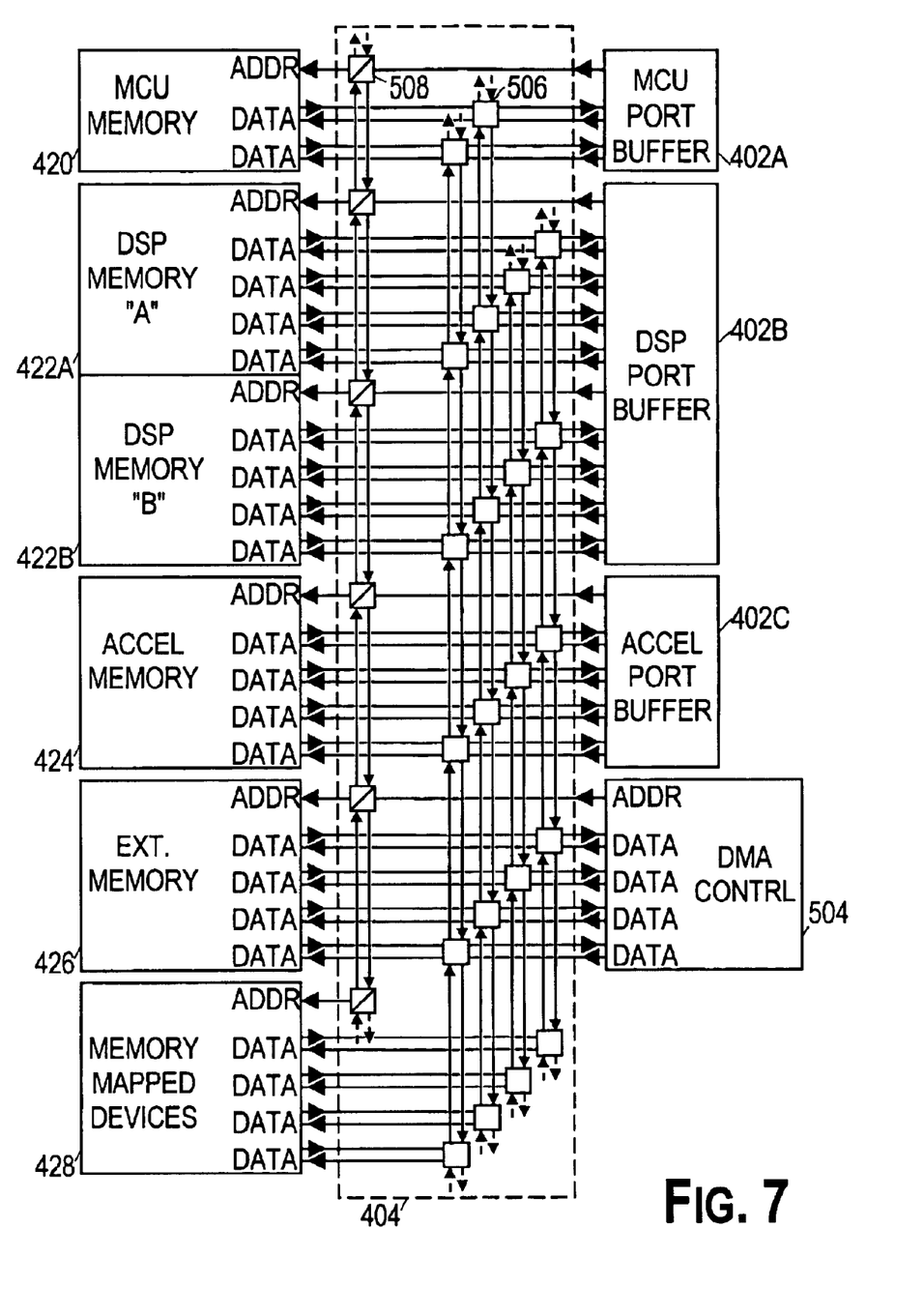
FIG. 7 is a functional block diagram of a router.

FIG. 7 shows a functional block diagram of an exemplary embodiment of router 404. Router 404 couples port logic 402 and direct memory access (DMA) controller 504 to memory modules 420–424, external memory 426, and memory mapped devices 428. DMA controller 504 is the portion of MMU 406 that conducts block transfers. It may be configured to generate addresses to read data from the source memory into a cache, and then to generate addresses to write data from the cache into the target memory. DMA controller 504 preferably includes logic to handle word-size and word-alignment issues that can crop up when data is transferred in blocks.

Router 404 includes bi-directional data channel bridges 506 and unidirectional address bus bridges 508. Router 404 preferably divides the data busses into data channels of uniform width, e.g. 8-bits. The channel bit-width is chosen to be a common integer factor of popular data bus bit-widths. Each data channel is coupled by a channel bridge 506 to a cross-bus data channel having the same bit-width. The address busses are be similarly coupled via address bridges 508 to an address cross-bus. The cross-bus preferably has a ring structure, i.e. the channel bridges at the bottom of FIG. 7 are coupled via the dashed arrows to the corresponding bridges at the top of FIG. 7.

Although this embodiment shows three processing units and the data channels in this embodiment are described as having eight bit data path widths, these numbers are not intended to be limiting in any way. Rather, the bus architecture is intended to be general, and is capable of being implemented in a wide variety of embodiments. Features of such embodiments may include having more channels, more processors, and perhaps larger data path widths. The memory modules may be multi-ported, in which case more data busses are expected to be associated with each memory module.

The read and write data paths preferably have eight-bit widths, as do the data cross-paths. Each of the bi-directional data paths are coupled to both directions of a cross-bus data channel by a bi-directional channel bridge 506, while each of the address paths are coupled to both directions of an address cross-bus by a unidirectional address bus bridge 508.

Figure 8:
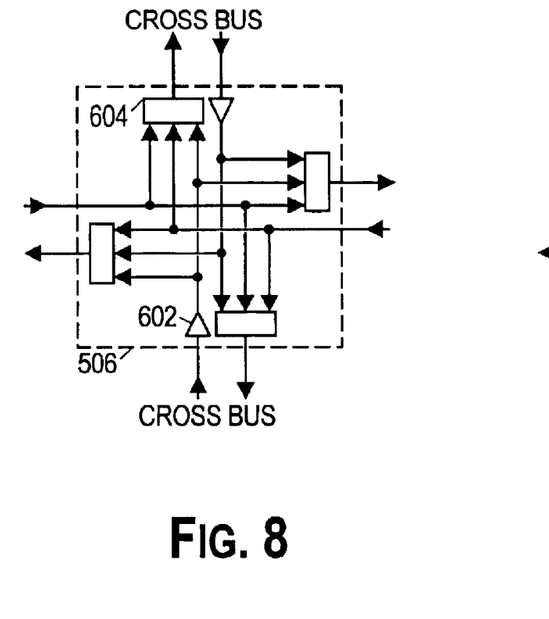
FIG. 8 is a functional block diagram of a data channel bridge.
Figure 9:
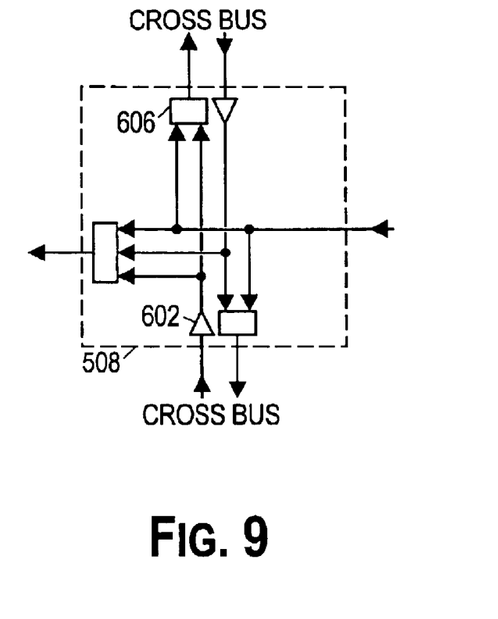
FIG. 9 is a functional block diagram of an address bus bridge.

Preferred embodiments for bridges 506, 508 are shown in FIGS. 8 and 9, respectively. The bridges include buffers 602 for the cross-bus signals, and multiplexers 604 for each of the outgoing signals. A multiplexer 604 for an outgoing signal selects from incoming signals from the other three directions. In the case of the unidirectional bridge 504, one of the incoming signals and one of the outgoing signals is removed. Consequently, the hardware is simplified and a two-input multiplexer 606 can be used. Control signals are provided from MMU 406 to the multiplexers 604, 606 to direct the bus signals as desired.

The buffers 602 may perform a latching function. In other words, the buffers latch bit signals from input bit lines, and provide the latched bit signals on the output lines on a subsequent clock cycle. This allows the cross-path to be divided into shorter segments that can carry different bit signals concurrently. However, propagation between segments accrues a latency of one clock-cycle per segment. Consequently, it may be desirable to provide some bridges with non-latching buffers to keep the number of segments to a minimum. In this manner, a trade-off between throughput and cross-path latency may be achieved.

It is noted that address paths do not necessarily have uniform bit widths, and consequently, the bit width of the address cross-path must be adequate to support the maximum address path bit width. At those junctions where the address path bit width is less than the cross-path bit width, not all of the cross-bus address bit lines are coupled to the memory address bit lines.

Multimedia systems typically have audio, video, administrative, and real-time tasks. The processor units generally need to trade data back and forth to carry out all these tasks. However, it is noted that these data exchanges are not random or unstructured. Rather, the tasks performed by multimedia systems tend to be well-defined tasks involving known memory sizes and predictable communications paths. If the memory modules are configured to support simultaneous reads and writes, memory access collisions can often be minimized by the software programmer. In the embodiment of FIG. 5, the microcontroller unit is expected to communicate primarily with the DSP, and only rarely directly with the hardware accelerator. Similarly, the hardware accelerator is expected to communicate primarily with the DSP and only rarely with the microcontroller unit. Consequently, the DSP is located on the cross-bus between the microcontroller unit and the accelerator and adjacent to both. This allows the processor units to realize a minimal latency when accessing "local" (their own) or "adjacent" (owned by the neighboring processor unit) memory pages.

As an example of the operation of the cooperative processing operations of the processor array, a video macroblock decoding operation is now described. Microcontroller 104 may be executing an operating system that instructs a memory mapped device to downloads an encoded video macroblock to the DSP memory 422 four bytes at a time. The microcontroller 104 then writes a "Start Viterbi Algorithm" mailbox message to the DSP's mailbox (the message may be written to the MCU memory 420, and a mailbox message transfer request sent to MMU 406). The DSP 320 receives the message and decodes the video macroblock using the Viterbi algorithm, writing the results to the hardware accelerator's memory 424. The DSP 320 sends a message to the accelerator's mailbox to start the inverse discrete cosine transform of the decoded macroblock. The accelerator 318 performs the IDCT, writing pixel results to the a video buffer in the memory mapped devices 428. Upon completion, the accelerator 318 sends a message to notify the MCU 104 of the completed transfer of the decoded video block to the video buffer.

Although digital signal processors and hardware accelerators have previously been used together with a microcontroller in multimedia systems, there has been no standardized method for coupling them together that would readily support the addition of more processing units without creating a performance bottleneck in the system. The disclosed architecture resolves these issues and further provides a logically-mapped shared memory. By providing a logically mapped shared memory and standardized interface ports, the disclosed architecture simplifies many programming and system design issues. The disclosed architecture also benefits in terms of scalability from the use of uniform-width data channels and the modularized memory. Finally, the use of request queues may provide for a way to eliminate critical path issues from the transfer master design, and thereby enable the architecture to "ride the technology curve", i.e. allow systems employing this architecture to be implemented using the newest integrated circuit technology with little or no system re-design.

As an advantage of the ability to scale the system, various system implementations may be designed with various numbers of processing units and/or various transfer master routing efficiencies (i.e. various effective bandwidths to memory) to provide a customer with a customized cost/performance tradeoff. Numerous such variations and modifications will become apparent to those skilled in the art once the above disclosure is fully appreciated. It is intended that the following claims be interpreted to embrace all such variations and modifications.

What is claimed is:

1. A data transfer apparatus that comprises:
   a first group of bus lines configured to transfer data bits between a first processing device and a corresponding first memory module;
   a second group of bus lines configured to transfer data bits between a second processing device and a corresponding second memory module;
   a group of cross-bus lines configured to transfer data bits between the fist group of bus lines and the second group of bus lines via bus bridges; and
   a memory management unit configured to receive memory access requests from the first and second processing devices and to responsively configure the bus bridges to steer address and data signals accordingly;
   wherein each group of bus lines includes two unidirectional bit lines for each data bit, and wherein the bus bridges include a multiplexer for each outgoing bit line that selects from three other incoming bit lines.

2. The data transfer apparatus of claim 1, wherein the memory management unit includes a DMA controller coupled to the group of cross-bus lines and configurable to transfer a block of data between said memory modules.

3. The data transfer apparatus of claim 2, wherein the memory management unit includes an interrupt controller configurable to assert an interrupt signal to said processing devices after completing a block transfer of data.

4. The data transfer apparatus of claim 1, wherein the memory management unit includes one or more request queues, wherein said one or more request queues includes a single transfer queue configured to store access requests relating to single data word transfers.

5. The data transfer apparatus of claim 4, wherein said one or more request queues includes a block transfer queue configured to store access requests relating to block data transfers.

6. The data transfer apparatus of claim 4, wherein said one or more request queues includes a message transfer queue configured to store message transfer requests.

7. The data transfer apparatus of claim 6, wherein the memory management unit includes an interrupt controller configurable to assert an interrupt signal to a processing device that is an addressee of a message transfer request.

8. The data transfer apparatus of claim 1, further comprising:
   port logic connected to the first and second groups of bus lines and configured to couple to the processing devices, wherein the port logic is further coupled to the memory management unit and configured to prevent writes to protected memory.

9. The data transfer apparatus of claim 1, wherein each group of bus lines includes at least three unidirectional bit lines.

10. A method for transferring data between a set of memory modules and a set of processor units, wherein the method comprises:
    said processing units providing transfer requests to a memory manager;
    said memory manager setting a router in a conflict-free access pattern in response to said transfer requests, wherein setting said router includes:
    said memory manager providing control signals to bus bridges that couple local busses between a memory module and a processing device to a cross-bus between the local busses;
    wherein the local busses each include two unidirectional bit lines for each data bit and the cross-bus includes two unidirectional bit lines for each data bit;
    wherein the bus bridges each include a multiplexer for each outgoing bit line that selects from multiple incoming bit lines; and
    said processing units accessing memory modules via said router.

11. The method of claim 10, wherein before setting said router, said memory manager determines said conflict-free access pattern in accordance with assigned priorities for each transfer request.

12. The method of claim 10, wherein said setting said router further includes:
    said memory manager operating a direct memory access (DMA) controller to perform block transfers of data between memory modules.

13. The method of claim 10, further comprising said memory manager asserting an interrupt signal to any one of said processor units that is the addressee of a message transfer request.

14. A high-bandwidth bus which comprises:
    a plurality of local bus line groups each for transferring data between a processing device and an associated memory module;
    cross-bus lines for transferring data among the plurality of local bus line groups, wherein said cross-bus is coupled to each of the plurality of local bus line groups by a bridge means that includes bi-directional data channel bridges and unidirectional address channel bridges; and a memory controller means for setting said bridge means to provide processing devices with access to memory modules, wherein the memory controller means is configured to provide highest priority for accesses from processing devices to the associated memory modules wherein the local bus line groups each include oppositely configured unidirectional bit lines for each data bit and the cross-bus lines includes oppositely configured unidirectional bit lines for each data bit.

15. A high-bandwidth bus system which comprises:

a plurality of local memory busses each for transferring data between a processing device and an associated memory module;

one or more local intersect busses for transferring data between the plurality of local memory busses, wherein said local intersect busses are coupled to each of the plurality of local memory busses by four multiplexers at each intersection and wherein the local intersect busses are segmented with latches to allow multiple data signals to be transmitted concurrently via the local intersect busses; and a memory controller means for setting each multiplexer to provide processing devices with access to memory modules, wherein the memory controller means is configured to provide highest priority for accesses from processing devices to the associated memory modules wherein the local memory busses each include two unidirectional bit lines for each data bit and the local intersect busses each include two unidirectional bit lines for each data bit.

16. The bus system of claim 15, wherein the four multiplexers forward data between a processing device and a memory device with essentially no latency delay.

17. The bus system of claim 16, further comprising a memory management unit that includes a DMA controller coupled to the local intersect busses and configurable to transfer a block of data between said memory modules.

18. The bus system of claim 17, wherein the memory management unit includes an interrupt controller configurable to assert an interrupt signal to said processing devices after completing a block transfer of data.

19. The bus system of claim 17, wherein the memory management unit includes one or more request queues, wherein said one or more request queues includes a single transfer queue configured to store access requests relating to single data word transfers.

20. The bus system of claim 19, wherein said one or more request queues includes a block transfer queue configured to store access requests relating to block data transfers.

21. The bus system of claim 19, wherein said one or more request queues includes a message transfer queue configured to store message transfer requests.

22. The bus system of claim 21, wherein the memory management unit includes an interrupt controller configurable to assert an interrupt signal to a processing device that is an addressee of a message transfer request.

23. The bus system of claim 17, further comprising:

port logic connected to the plurality of local memory busses and configured to couple to the processing devices, wherein the port logic is further coupled to the memory management unit and configured to prevent writes to protected memory.

24. A system, comprising:

a plurality of processors;

a plurality of memory modules, each memory module being coupled to and paired with one of the processors via separate sets of bus lines such that a data read requested from processor to a paired memory module is received on a first clock cycle subsequent to a clock cycle that provides an address;

a set of segmented cross-bus lines that couple to the separate sets of bus lines using buffers such that multiple data signals are simultaneously transferable between the sets of bus lines via the cross-bus lines;

wherein the cross-bus lines are configurable to latch signals to the separate sets of bus lines such that throughput and cross-path latency between processors and memories that are not paired is customizable.

25. The system of claim 24 wherein at least two sets of the bus lines have different widths.

* * * * *